Sept. 1, 1953  G. R. STIBITZ  2,650,500
FUNCTION UNIT
Filed Nov. 13, 1952  4 Sheets-Sheet 1

Inventor:
George R. Stibitz
by his Attorneys
Darby & Darby

Sept. 1, 1953 G. R. STIBITZ 2,650,500
FUNCTION UNIT
Filed Nov. 13, 1952 4 Sheets-Sheet 2
Fig. 2.
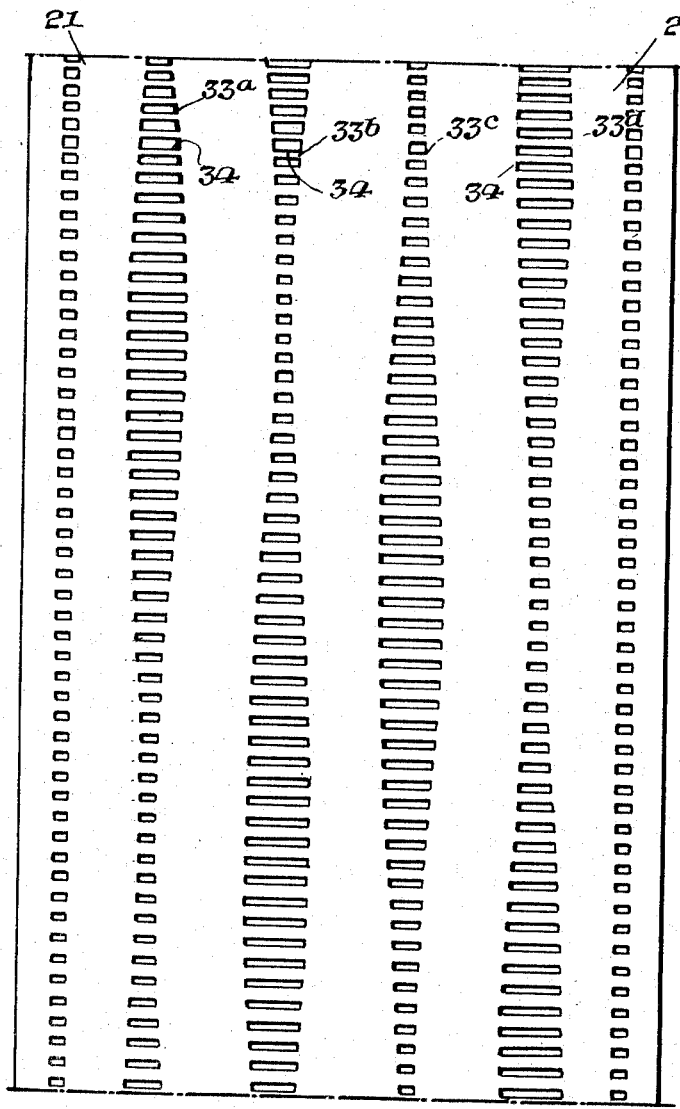
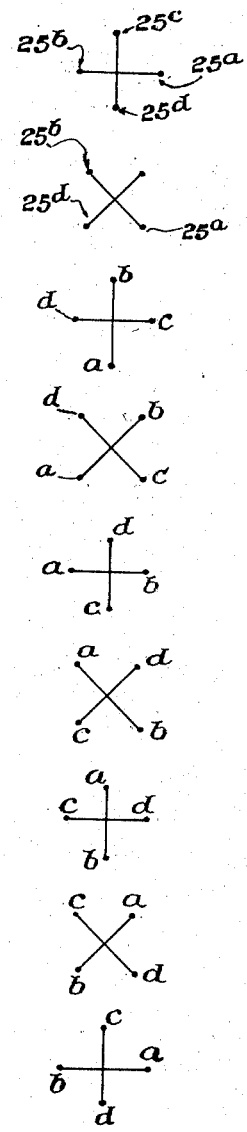
Inventor.
George R. Stibitz
by his Attorneys,
Darby & Darby Sept. 1, 1953
G. R. STIBITZ
2,650,500
FUNCTION UNIT
Filed Nov. 13, 1952
4 Sheets-Sheet 3
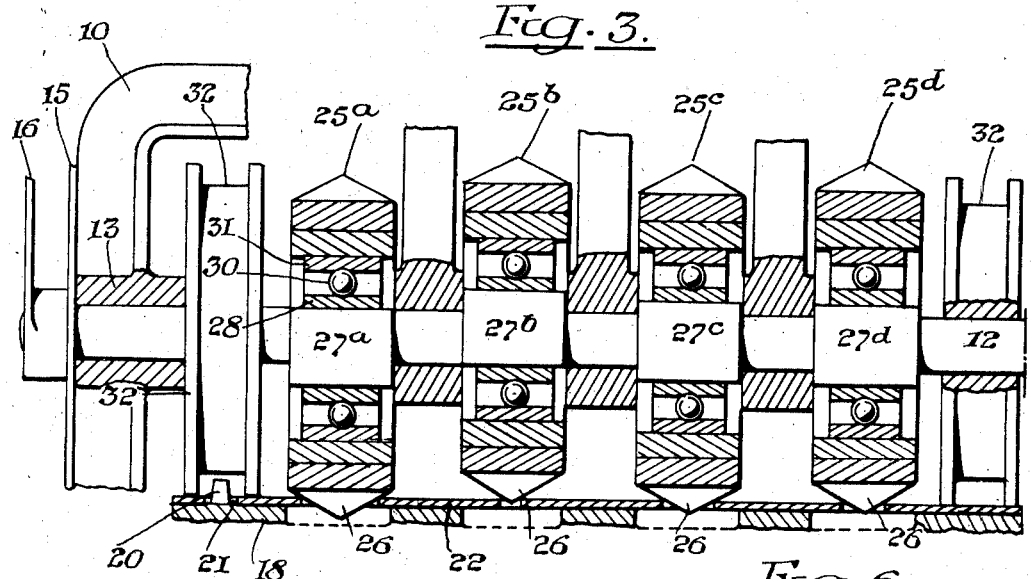
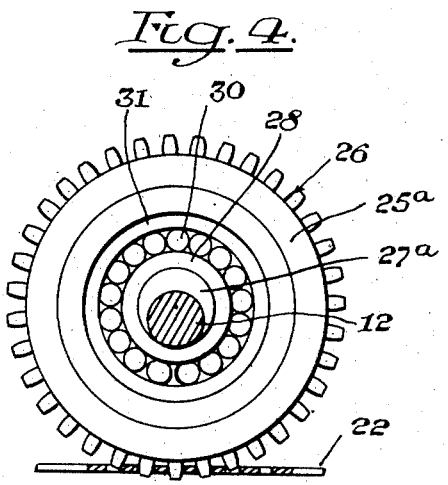
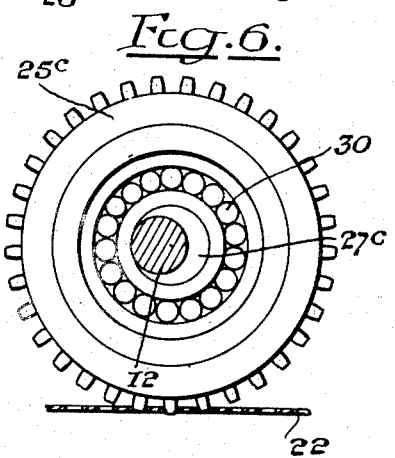
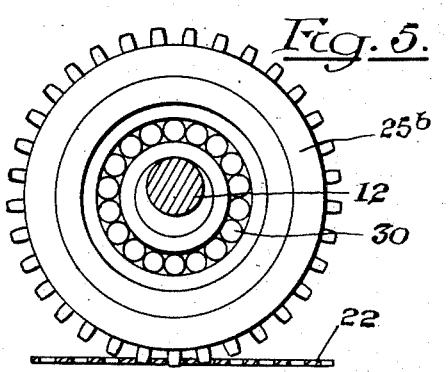
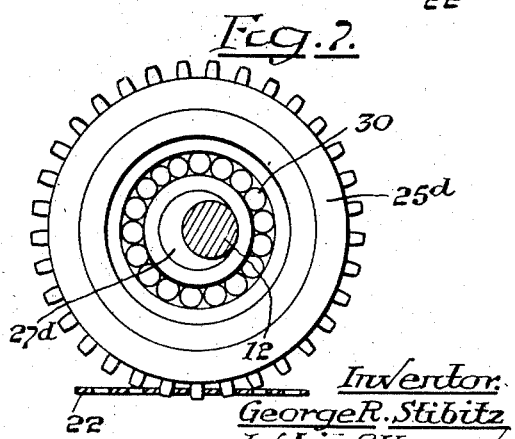
Inventor:
George R. Stibitz
by his Attorneys
Darby & Darby

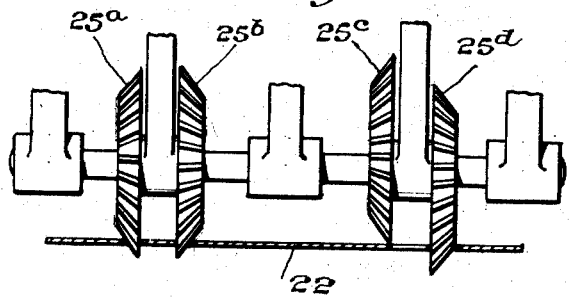
Fig. 8.
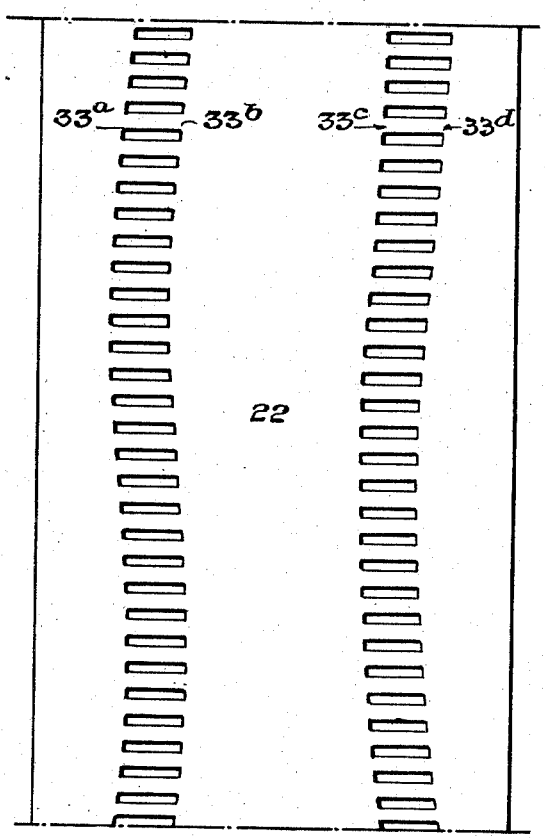
Fig. 9.
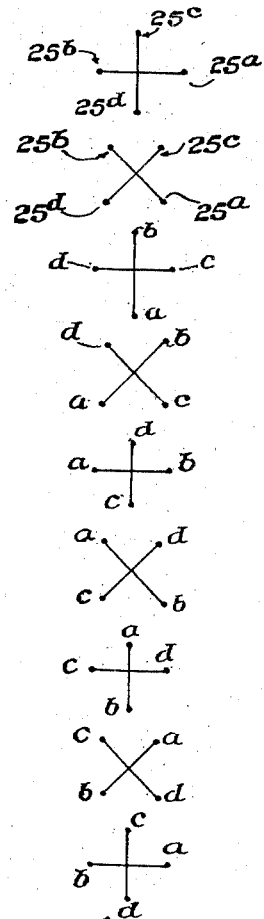
Inventor:
George R. Stibitz
by his Attorneys,
Darly & Darly Patented Sept. 1, 1953

2,650,500

UNITED STATES PATENT OFFICE 2,650,500

FUNCTION UNIT

George R. Stibitz, Burlington, Vt.

Application November 13, 1952, Serial No. 320,175

9 Claims. (Cl. 74—1)

The present invention relates to function units, that is, to devices which serve to transform an input movement into an output movement in accordance with some mathematical law or arbitrary relationship.

More particularly, the invention relates to a device by means of which a certain number of revolutions of input shaft causes an output shaft to rotate through a number of revolutions dependent both upon the input revolutions and a mathematical law or arbitrary relationship incorporated in a controlling element interposed between the input shaft and the output shaft. The controlling element is not permanently incorporated in the mechanism so that the law of operation of the output shaft with respect to the input shaft may be changed at will.

More particularly still the invention relates to a function unit in which the output shaft is driven through the medium of a plurality of eccentrics mounted thereon and the controlling element is a tape driven by the input shaft and carrying cam tracks thereon which cam tracks, through cooperation with the eccentrics, control the movement of the output shaft. It will be understood that the cam tracks are correlated so that no inoperative positions result, that is, there are no dead center positions of the shaft which are effective to destroy operability of the device.

A device in accordance with the foregoing description has been described and claimed in my copending application Serial No. 7,982, filed February 12, 1948. In that device the controlling tape is provided with cam tracks in the form of grooves of varying depth and the eccentrics operate in these grooves and thus determine the relationship of revolutions of the input shaft to revolutions of the output shaft.

The present invention is an improvement upon that arrangement. In the present device the cam tracks are formed of transverse openings of varying length in the tape or in some instances of constant width but of varying displacement from a center line. Cooperating with the cam tracks thus formed are eccentrics substantially identical with those described in the application above-mentioned, save that they are provided on their peripheries with teeth having a generally triangular form and spaced for cooperation with the transverse openings in the tape. This arrangement eliminates the possibility of slippage between the control element and the output shaft. Additionally, the controlling tape is more readily produced since the tape is punched through and this is a relatively simple operation whereas in the form of tape described in my copending application above-mentioned, the tape is provided with grooves each having portions of varying depth which require a relatively difficult machining operation.

It is an object of my invention to provide a function unit of the type wherein the output shaft is driven through eccentrics mounted thereon the eccentrics being in turn driven by means of a control tape advanced by an input shaft, the control tape having cam tracks in the form of transverse openings of varying length.

It is another object of the invention to provide a device as described above wherein the cam tracks comprise openings of the same length but arranged so that the envelope of their ends forms a curve of varying displacements from its center line.

It is a still further object of the invention to provide a device as described above wherein the eccentrics are provided with teeth on their periphery, the teeth being inclined with respect to the axis of rotation so that these teeth will enter into the cam track openings, the depth of penetration being determined by the length of the slots or the displacement thereof relative to the center line of the gear face.

Other objects and features of the invention will be apparent when the following description is considered in connection with the annexed drawings, in which, Figure 1 is a side elevation of one form of my invention;

Figure 2 is a top plan view of a fragment of control tape for use with the device of Figure 1, the tape shown being merely illustrative of the solution of one problem. This view also includes a showing of the position of the various eccentrics when in contact with the portions of the tape opposite which they appear.

Figure 3 is a fragmentary cross-sectional view of the device of Figure 1 illustrating particularly the mounting of the eccentric members on the output shaft and their manner of cooperation with the control tape;

Figures 4, 5, 6 and 7 are transverse sectional views taken on the plane of the lines 4—4, 5—5, 6—6, 7—7 respectively of Figure 3 showing the positional relationships of the eccentrics to each other;

Figure 8 is a side elevation of a modified form of my invention wherein each cam track controls the position of two eccentrics; and Figure 9 is a plan view of a fragment of tape punched in a manner to operate the device of Figure 8. This view also includes a showing of the positions of the various eccentrics when in contact with the portions of the tape opposite which they appear.

Figure 1:
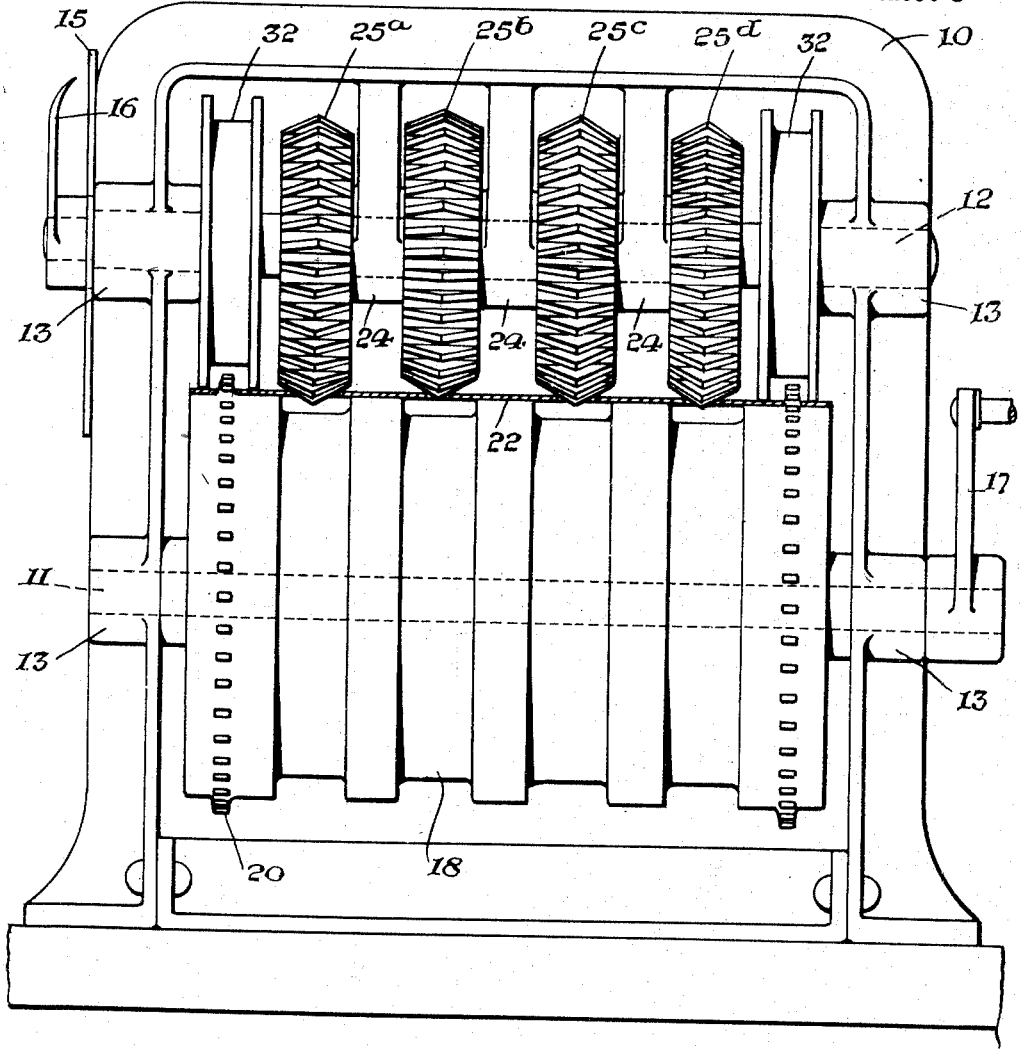

Referring now to the drawings and particularly to Figure 1, there is shown therein a framework 10 in which an input shaft 11 and an output shaft 12 are supported, the shafts of course being journalled in suitable bearings indicated at 13. Fixed to the frame 10 is a dial 15 with which a pointer 16, fixed to the shaft 12, co-operates.

Mounted on the input shaft 11 is a crank 17 by means of which the shaft and a drum 18 may be rotated. Sprocket teeth 20 are provided adjacent the ends of the drum 18 to cooperate with narrow slots 21 in the control tape 22 (see Figure 2). Drum 18 is also provided with four peripheral grooves 23.

The output shaft 12, in addition to being supported in the end bearings 13, is supported in the intermediate bearings 24 so that this shaft is rigidly supported and is not subject to deflection. Shaft 12 has mounted thereon four eccentrics 25a, 25b, 25c, and 25d, these eccentrics being provided on their peripheries with triangularly shaped teeth 26 (see Figure 3). The eccentric mounting is accomplished by providing the shaft 12 with four eccentric portions 27a, 27b, 27c, and 27d, the portions being offset from each other at angles of 90°. Mounted on each eccentric portion 27 is a ball bearing comprising inner race 28, balls 30 and outer race 31. The eccentric 25 is then mounted directly upon the outer race 31 of the ball bearing.

Mounted concentrically on the shaft 12 are two wheels 32, one at either end of the shaft. These wheels are peripherally grooved and co-operate with the sprocket teeth 20 in the drum 18 to assure that the teeth mesh with the slots 21 in tape 22.

Referring now to Figure 2, it will be seen that four cam tracks 33a, 33b, 33c, and 33d are provided in the tape the cam tracks being comprised of slots 34 of varying transverse length so that a line drawn through the ends of the slots of a cam track will form a curve having a smooth variation from maximum to minimum value. The curves formed by the ends of the slots 34 of cam tracks 33a, 33b, 33c, and 33d are displaced with respect to each other, that is, the maximum length of slot in the cam track 33a associated with eccentric 25a will be displaced 180° from the maximum length of cam slot in the track 33b associated with the eccentric 25b. The maximum width of slot in the cam tracks 33c and 33d associated with eccentrics 25c and 25d will occur at points 90° removed from the maximums of eccentrics 25a and 25b respectively. In speaking of the displacements of the various cam tracks with respect to each other it will be understood that reference is made to displacements relative to a complete cycle which has no necessary relationship to the eccentric or drum diameters or the number of teeth on the eccentric gears. The cam track curves are of course identical with each other but out of phase as described above.

The various eccentric gears 25 are of course mounted on shaft portions 27 having the same amount of eccentricity so that the cam tracks formed by the spaced slots cause equal rise and fall of the various eccentrics for equal variations in the slot length.

As is clearly seen in Figure 1, the transverse length of the slots determines the position of the eccentrics since the sloped teeth of the eccentrics can enter the grooves 23 of the drum 18, only to the extent permitted by the slots 34. Since the slots 34 are arranged, as indicated above, in a pattern which produces four curves having their maximum points offset at 90° to each other, the shaft 12 is caused to rotate by the change in position of the eccentrics brought about by the change in transverse length of the slots 34.

In the sketches at the right of Figure 2 the positions of the eccentric centers are indicated by the reference characters 25a, 25b, 25c, and 25d and each sketch is placed opposite the portion of the cam track which will bring about that particular positioning of the eccentrics.

The tape shown at 22 is of course purely illustrative and the curves may be greater or less in lateral length and may vary materially from the shape shown, the only requirement being that the curves always maintain the 90° spaced relationship.

It is possible, for example, to have an area in the tape in which one cam track consists of slots of the maximum width and a second of slots of the minimum width and the remaining two tracks of slots of intermediate width. This would result in the output shaft standing still during rotation of the input shaft since the eccentrics would not be caused to rise or fall and therefore have no effect on the output shaft 12.

It will be seen that as the crank 17 is turned the tape 22 will advance being driven by the sprocket teeth 20. The slots forming the various cam tracks will of course cause rotation of the eccentrically mounted gears 25 but the rotation will be without effect on the output shaft 12, that shaft being rotated only in accordance with the vertical change in position of the eccentrics. Thus the device may be arranged to produce rotations of the output shaft which depend upon the number of rotations of the input shaft as modified by the configuration of the curves formed by the varying widths of the slot 21. The dial 15 and pointer 16 are of course provided in order that the rotation of the output shaft can be readily observed.

In Figure 8 I have shown a slightly modified form of my invention, and in Figure 9 a section of control tape for operating this form of the invention.

The mechanical construction of the device shown in Figure 8 is substantially identical with that shown in Figures 1 and 3 through 7. This device differs from the one just above described in that the eccentrics 25, instead of being provided with teeth sloping in both directions from the central circumferential line, slope in one direction only from their maximum circumference. Thus each of the eccentrics 25 of Figure 8 may be said to be essentially one-half of the eccentric 25 of Figure 3. When the arrangement of Figure 8 is utilized a pair of cam tracks is combined into one and instead of the slots being of varying lengths the slots are of equal length but are displaced varying amounts with respect to the longitudinal center line of the cam curve which center line is located midway between two adjacent eccentrics 25.

Reference to Figures 8 and 9 will show that the left-hand edge of the slots forming the cam track 33a of Figure 9 are effective to control the position of the eccentric 25a of Figure 8 while the right-hand edges of the slots of the same cam track are effective to control the position of the eccentric 25b. In a similar manner the left and right hand edges of the right hand cam track of Figure 8 control the position of eccentrics 25c and 25d respectively. Figure 9 also shows schematically the positions of the various eccentric centers when the curves formed by the cam tracks of Figure 9 are positioned beneath the eccentrics. In the sketches at the right of Figure 9 the positions of the eccentric centers are indicated by the reference characters 25a, 25b, 25c, and 25d and each sketch is placed opposite the portion of the cam track which will bring about that particular positioning of the eccentrics.

As was true in the case of the control tape indicated in Figure 2 the control tape of Figure 9 is purely illustrative and can be formed with different curves to effectuate different actuation of the output shaft. These control tapes are of course laid out in accordance with the particular type of problem which is to be solved.

The control tapes may be formed in any suitable manner. For example, the tape, which is preferably made of a hard metal, may be prepunched with guide holes extending longitudinally of the tape in rows in alignment with the center line of the various eccentrics. The guide holes can then be enlarged to the transverse length required by the particular pattern. This may be done, for example, by using a series of punches of varying widths or may be accomplished by using a broach to enlarge the holes to the required extent. In the Figure 9 form the slots are of equal length and may be formed by shifting a punch relative to the tape in accordance with the pattern desired.

Although in both forms of the invention I have shown sprocket wheels for driving the tapes, it is entirely possible to omit these holes and form toothed surfaces in place of the grooves 23. With this arrangement the gear teeth thus formed on the drum mesh with the teeth on the eccentric rollers and position the tape so that no separate feed holes and sprocket teeth are necessary.

As in my copending application above referred to the control tape is of great length and is mounted upon a suitable pair of reels being taken from one reel and wound upon the other.

While I have described preferred embodiments of my invention, it will be understood that many modifications may be made within the scope thereof. Consequently, I wish to be limited not by the foregoing description, but solely by the claims granted to me.

What is claimed is:

1. A device of the type described comprising an input shaft, a plurality of eccentrics mounted on said output shaft with their points of maximum eccentricity equally angularly spaced, and a control tape comprising a plurality of cam tracks equal in number to the number of eccentrics, said control tape being driven by said input shaft, each said cam track comprising a plurality of transverse openings in the tape, the envelope of at least one end of all the slots of a track forming a curve in accordance with a law of operation, the curve of a cam track being in an out-of-phase relationship relative to the other cam tracks corresponding to the out-of-phase position of said eccentrics, said eccentrics having teeth spaced to conform with the longitudinal spacing of said transverse openings, said teeth having faces inclined to the axis of said output shaft whereby the amount of penetration of said teeth into said openings determines the position of the output shaft.

2. A device in accordance with claim 1 characterized in that a drum is mounted on said input shaft and said control tape is driven by said drum.

3. A device in accordance with claim 1 characterized in that said control tape is provided with longitudinally spaced feed holes and said input shaft has a drum mounted thereon, said drum carrying teeth cooperating with said feed holes to feed said control tape past said eccentrics.

4. A device in accordance with claim 1 characterized in that said input and output shafts have their axes parallel to each other.

5. A device in accordance with claim 1 characterized in that each cam track is formed of a plurality of transversely extending openings of varying width and said eccentrics have teeth of generally triangular shape with their apices forming the point of maximum diameter of the eccentric face.

6. A device as claimed in claim 1 characterized in that the transverse openings forming the cam tracks are of equal length, the ends of said openings being displaced with respect to the center line to form a curve.

7. A device as claimed in claim 1 characterized in that said input shaft has a drum mounted thereon, said drum having a groove underlying each cam track, each said groove extending axially for a distance equal to the maximum transverse length and displacement of said transverse openings.

8. A device as claimed in claim 1 characterized in that said cam tracks are arranged in pairs, each track cooperating with one of said eccentrics, each pair of tracks comprising a plurality of longitudinally spaced slots of equal length, the envelope of the ends of said slots forming parallel curves, the eccentrics cooperating with said slots being mounted with their points of maximum eccentricity spaced 180° out of phase.

9. A device as claimed in claim 8 characterized in that the eccentrics of a pair have toothed faces inclined to the output shaft axis in opposite directions, said eccentrics being arranged on said shaft so that the greatest circumferential portion of the toothed faces are adjacent each other.

GEORGE R. STIBITZ.

No references cited.